US012615241B2

(12) United States Patent
Doggett et al.

(10) Patent No.: US 12,615,241 B2
(45) Date of Patent: Apr. 28, 2026

(54) SECURING ACCESS TO A VIRTUAL MACHINE VIA A SERVICE PROCESSOR USING A KEY

(71) Applicant: International Business Machines Corporation, Armonk, NY (US)

(72) Inventors: Kristian Doggett, Austin, TX (US); Douglas Griffith, Round Rock, TX (US); Walter Scott Scanlan, Edina, MN (US); Anil Kalavakolanu, Austin, TX (US); Hariganesh Muralidharan, B. Narayanapura (IN); Maisha Choudhury, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 18/140,205

(22) Filed: Apr. 27, 2023

(65) Prior Publication Data

US 2024/0364665 A1 Oct. 31, 2024

(51) Int. Cl.
*H04L 9/40* (2022.01)

(52) U.S. Cl.
CPC ...... *H04L 63/0435* (2013.01); *H04L 63/0876* (2013.01); *H04L 63/166* (2013.01)

(58) Field of Classification Search
CPC H04L 63/0435; H04L 63/0876; H04L 63/166
See application file for complete search history.

(56) References Cited

U.S. PATENT DOCUMENTS

| | | | |
|---|---|---|---|
| 8,607,054 B2 | 12/2013 | Ramarathinam et al. | |
| 8,782,398 B2 * | 7/2014 | Mirashrafi | .............. G06F 21/36 |
| | | | 713/155 |
| 8,880,882 B2 * | 11/2014 | Kulkarni | ................. G06F 21/33 |
| | | | 713/168 |
| 8,977,867 B2 | 3/2015 | Rangegowda et al. | |
| 9,130,824 B2 | 9/2015 | Bhatia et al. | |

(Continued)

FOREIGN PATENT DOCUMENTS

| | | |
|---|---|---|
| CA | 2898908 C | 7/2014 |
| CN | 103605536 B | 4/2017 |

(Continued)

*Primary Examiner* — Viral S Lakhia
(74) *Attorney, Agent, or Firm* — Shackelford, McKinley & Norton, LLP; Robert A. Voigt, Jr.

(57) ABSTRACT

A computer-implemented method, system and computer program product for securing access to a virtual machine via a service processor. A broadcasted request from a computing device of a user to establish a virtual session with the virtual machine through a service processor is received. Such a broadcasted request includes an identifier of the virtual machine as well as a key. A secure connection between the service processor and the computing device of the user is established in response to the broadcasted identifier of the virtual machine matching the identifier of the virtual machine in the service processor table. After establishing the secure connection between the service processor and the computing device of the user, a secure connection between the service processor and the virtual machine is established in response to the broadcasted key matching the key associated with the identifier of the virtual machine in the service processor table.

20 Claims, 6 Drawing Sheets

(56) References Cited

U.S. PATENT DOCUMENTS

| | | | |
|---|---|---|---|
| 9,300,640 B2 | 3/2016 | Pate | |
| 9,311,483 B2 | 4/2016 | Kurien et al. | |
| 9,385,997 B2* | 7/2016 | Okimoto | H04L 63/0428 |
| 9,483,639 B2 | 11/2016 | Sliwa et al. | |
| 9,513,947 B2 | 12/2016 | Hiebert et al. | |
| 9,678,780 B2 | 6/2017 | Singh et al. | |
| 9,866,553 B2 | 1/2018 | Brossard et al. | |
| 9,880,867 B2 | 1/2018 | Delco | |
| 10,021,077 B1* | 7/2018 | Brown | H04L 63/123 |
| 10,686,779 B2* | 6/2020 | Glozman | H04L 63/0428 |
| 10,742,403 B2* | 8/2020 | Schubert | B60R 25/241 |
| 10,826,905 B2 | 11/2020 | Gujarathi | |
| 10,972,452 B2 | 4/2021 | Mathaiyan et al. | |
| 11,038,954 B2* | 6/2021 | Cochran | G06F 9/45558 |
| 11,100,209 B2 | 8/2021 | Anjali et al. | |
| 11,182,192 B2 | 11/2021 | Heller et al. | |
| 11,233,787 B2 | 1/2022 | Clark et al. | |
| 11,323,274 B1 | 5/2022 | Bowen et al. | |
| 11,601,434 B1 | 3/2023 | Hornsby et al. | |
| 11,843,604 B2 | 12/2023 | Prunier et al. | |
| 11,886,565 B2 | 1/2024 | Kim et al. | |
| 11,889,314 B2* | 1/2024 | Yokum | H04W 12/069 |
| 12,223,337 B2 | 2/2025 | Levin et al. | |
| 12,259,958 B2 | 3/2025 | Shear et al. | |
| 2009/0125901 A1 | 5/2009 | Swanson | |
| 2010/0318993 A1 | 12/2010 | Goud et al. | |
| 2013/0145179 A1 | 6/2013 | Rangegowda et al. | |
| 2013/0179558 A1* | 7/2013 | Lin | H04L 41/04 709/223 |
| 2013/0268757 A1* | 10/2013 | Kulkarni | G06F 21/6236 713/168 |
| 2013/0346740 A1* | 12/2013 | Mirashrafi | G06F 21/84 713/155 |
| 2014/0059680 A1 | 2/2014 | Kurien et al. | |
| 2014/0149492 A1 | 5/2014 | Ananthanarayanan et al. | |
| 2014/0278623 A1 | 9/2014 | Martinez et al. | |
| 2015/0003607 A1* | 1/2015 | Choi | H04L 63/065 380/44 |
| 2015/0081909 A1 | 3/2015 | Cochran et al. | |
| 2015/0318986 A1* | 11/2015 | Novak | H04L 9/0894 713/189 |
| 2016/0277372 A1* | 9/2016 | Shah | H04L 63/0485 |
| 2017/0026174 A1* | 1/2017 | Pang | H04W 12/50 |
| 2017/0201375 A1* | 7/2017 | Amin | H04L 63/061 |
| 2018/0159856 A1 | 6/2018 | Gujarathi | |
| 2020/0067914 A1* | 2/2020 | Glozman | H04W 12/08 |
| 2020/0285499 A1 | 9/2020 | Heller et al. | |
| 2021/0034734 A1 | 2/2021 | Rohde et al. | |
| 2021/0200864 A1 | 7/2021 | Rudnik | |
| 2021/0226937 A1* | 7/2021 | Mathaiyan | H04L 9/0891 |
| 2021/0258265 A1 | 8/2021 | Bernat et al. | |
| 2021/0377287 A1 | 12/2021 | Shua | |
| 2022/0329412 A1* | 10/2022 | McGee | H04L 9/30 |
| 2022/0345483 A1* | 10/2022 | Shua | H04L 9/0825 |
| 2023/0104368 A1 | 4/2023 | Miriyala et al. | |
| 2023/0344716 A1 | 10/2023 | Yarvis et al. | |
| 2023/0418651 A1 | 12/2023 | Prabhu et al. | |

FOREIGN PATENT DOCUMENTS

| | | |
|---|---|---|
| CN | 104883277 B | 6/2018 |
| CN | 106201646 B | 3/2020 |
| KR | 10-2474989 B1 | 12/2022 |

* cited by examiner

400

SERVICE PROCESSOR TABLE

SECURING ACCESS TO A VIRTUAL MACHINE VIA A SERVICE PROCESSOR USING A KEY

TECHNICAL FIELD

The present disclosure relates generally to a distributed computing environment, and more particularly to securing access to a virtual machine via a service processor using a key.

BACKGROUND

A distributed computing environment is an integrated set of services and tools, which may be used for building and running distributed applications. When managing resources in a distributed computing environment, users may need to connect to a virtual machine, such as to execute applications. Currently, a user is connected to a virtual machine via a connection provided by a service processor.

A service processor is used to facilitate connectivity. For example, such a service processor may correspond to a small, specialized processor used for remote monitoring and management of a host system. The specialized processor may include an ARM-based SoC (System on Chip) with graphics and control logic built in. The service processor is commonly located on the main motherboard of the computer, server, network or storage device (the "baseboard") and can be accessed remotely either via a dedicated or shared network connection. Furthermore, the service processor has multiple connections to the host system, giving it an ability to monitor hardware via sensors, flash BIOS (basic input/output system)/UEFI (unified extensible firmware interface) firmware, give console access via serial or physical/virtual KVM (kernel-based virtual machine), power cycle the host, and log events.

Currently, in order for the service processor to establish the connection to the virtual machine for the user, an intermediary application, such as a hardware management console, creates a bridge between the user's computing device and the service processor, which then creates a connection to the virtual machine. A hardware management console is a hardware appliance that can be used to configure and control one or more managed systems.

Typically, after the user accesses the intermediary application, such as a hardware management console, the intermediary application sends API commends to the service processor to create a virtual terminal (connection between the service processor and the virtual machine) accessible from the intermediary application.

In such a connection method, the intermediary application needs to store information about all the resources it manages, including the virtual machine information. By storing such virtual machine information, an operational layer is added that provides extraneous information not needed by a user of the virtual machine.

Furthermore, there is no security mechanism that is passed directly from the user to the virtual machine to authenticate a connection between the service processor and the virtual machine. That is, there is not currently a means for ensuring that the connection between the service processor and the virtual machine is the appropriate connection for the appropriate user.

SUMMARY

In one embodiment of the present disclosure, a computer-implemented method for securing access to a virtual machine comprises receiving a broadcasted request from a computing device of a user to establish a virtual session with the virtual machine through a service processor, where the broadcasted request comprises an identifier of the virtual machine and a key. The method further comprises establishing a secure connection between the service processor and the computing device of the user in response to matching the broadcasted identifier of the virtual machine with an identifier of the virtual machine in a table. The method additionally comprises establishing a secure connection between the service processor and the virtual machine in response to matching the broadcasted key with a key associated with the identifier of the virtual machine in the table.

In this manner, the previously required operational layer of virtual machine information is eliminated while adding a new layer of authentication to ensure that the connection between the service processor and the virtual machine is the appropriate connection for the appropriate user. Furthermore, in this manner, a virtual session with a virtual machine is established without the requirement of a software layer to create a virtual session. Instead, only a single secure connection (e.g., SSH connection) between the computing device of the user and the service processor needs to be established. As a result, a secure access to a virtual machine via a service processor is achieved.

In another embodiment of the present disclosure, a computer program product for securing access to a virtual machine, where the computer program product comprises one or more computer readable storage mediums having program code embodied therewith, where the program code comprises programming instructions for receiving a broadcasted request from a computing device of a user to establish a virtual session with the virtual machine through a service processor, where the broadcasted request comprises an identifier of the virtual machine and a key. The program code further comprises the programming instructions for establishing a secure connection between the service processor and the computing device of the user in response to matching the broadcasted identifier of the virtual machine with an identifier of the virtual machine in a table. The program code additionally comprises the programming instructions for establishing a secure connection between the service processor and the virtual machine in response to matching the broadcasted key with a key associated with the identifier of the virtual machine in the table.

In this manner, the previously required operational layer of virtual machine information is eliminated while adding a new layer of authentication to ensure that the connection between the service processor and the virtual machine is the appropriate connection for the appropriate user. Furthermore, in this manner, a virtual session with a virtual machine is established without the requirement of a software layer to create a virtual session. Instead, only a single secure connection (e.g., SSH connection) between the computing device of the user and the service processor needs to be established. As a result, a secure access to a virtual machine via a service processor is achieved.

In a further embodiment of the present disclosure, a system comprises a memory for storing a computer program for securing access to a virtual machine and a processor connected to the memory. The processor is configured to execute program instructions of the computer program comprising receiving a broadcasted request from a computing device of a user to establish a virtual session with the virtual machine through a service processor, where the broadcasted request comprises an identifier of the virtual machine and a key. The processor is further configured to execute program instructions of the computer program comprising establishing a secure connection between the service processor and the computing device of the user in response to matching the broadcasted identifier of the virtual machine with an identifier of the virtual machine in a table. The processor is additionally configured to execute program instructions of the computer program comprising establishing a secure connection between the service processor and the virtual machine in response to matching the broadcasted key with a key associated with the identifier of the virtual machine in the table.

In this manner, the previously required operational layer of virtual machine information is eliminated while adding a new layer of authentication to ensure that the connection between the service processor and the virtual machine is the appropriate connection for the appropriate user. Furthermore, in this manner, a virtual session with a virtual machine is established without the requirement of a software layer to create a virtual session. Instead, only a single secure connection (e.g., SSH connection) between the computing device of the user and the service processor needs to be established. As a result, a secure access to a virtual machine via a service processor is achieved.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
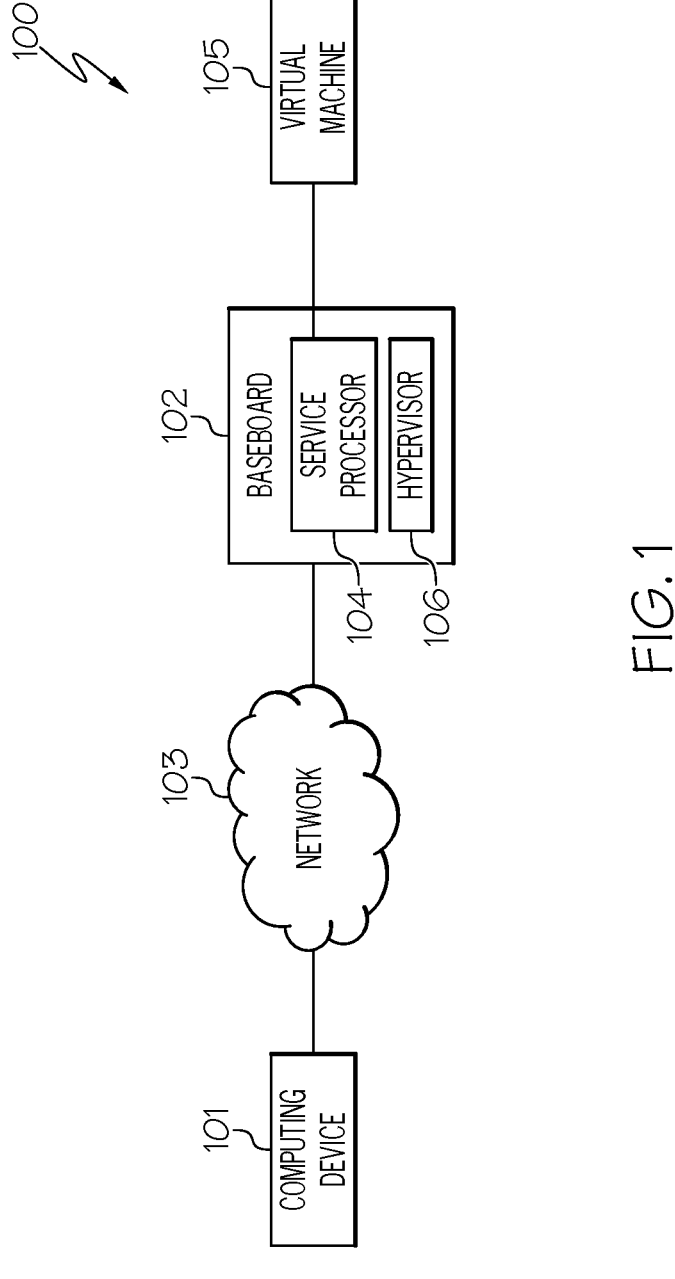
FIG. 1 illustrates a communication system for practicing the principles of the present disclosure in accordance with an embodiment of the present disclosure.

As stated in the Background section, when managing resources in a distributed computing environment, users may need to connect to a virtual machine, such as to execute applications. Currently, a user is connected to a virtual machine via a connection provided by a service processor.

A service processor is used to facilitate connectivity. For example, such a service processor may correspond to a small, specialized processor used for remote monitoring and management of a host system. The specialized processor may include an ARM-based SoC (System on Chip) with graphics and control logic built in. The service processor is commonly located on the main motherboard of the computer, server, network or storage device (the "baseboard") and can be accessed remotely either via a dedicated or shared network connection. Furthermore, the service processor has multiple connections to the host system, giving it an ability to monitor hardware via sensors, flash BIOS (basic input/output system)/UEFI (unified extensible firmware interface) firmware, give console access via serial or physical/virtual KVM (kernel-based virtual machine), power cycle the host, and log events.

Currently, in order for the service processor to establish the connection to the virtual machine for the user, an intermediary application, such as a hardware management console, creates a bridge between the user's computing device and the service processor, which then creates a connection to the virtual machine. A hardware management console is a hardware appliance that can be used to configure and control one or more managed systems.

Typically, after the user accesses the intermediary application, such as a hardware management console, the intermediary application sends API commends to the service processor to create a virtual terminal (connection between the service processor and the virtual machine) accessible from the intermediary application.

In such a connection method, the intermediary application needs to store information about all the resources it manages, including the virtual machine information. By storing such virtual machine information, an operational layer is added that provides extraneous information not needed by a user of the virtual machine.

Furthermore, there is no security mechanism that is passed directly from the user to the virtual machine to authenticate a connection between the service processor and the virtual machine. That is, there is not currently a means for ensuring that the connection between the service processor and the virtual machine is the appropriate connection for the appropriate user.

The embodiments of the present disclosure provide a means for eliminating the operational layer that provides extraneous information not needed by a user of the virtual machine by eliminating the requirement of using the intermediary application (e.g., hardware management console) for establishing the connection to the virtual machine for the user. Furthermore, embodiments of the present disclosure provide a means for ensuring that the connection between the service processor and the virtual machine is the appropriate connection for the appropriate user. In one embodiment, the service processor of the baseboard (e.g., computer, server, storage device, etc.) receives a broadcasted requested from a computing device of a user to establish a virtual session with a virtual machine through the service processor.

In one embodiment, the broadcasted request includes an identifier (e.g., universally unique identifier) of the virtual machine and a key. A key, as used herein, refers to a unique identifier that points to its associated value (e.g., identifier of a virtual machine) stored in a table. Upon matching the broadcasted identifier of the virtual machine with an identifier of the virtual machine in a table of the service processor ("service processor table"), the service processor of the baseboard establishes a secure connection, such as via the secure shell (SSH) protocol, between the service processor and the computing device of the user. Furthermore, upon matching the broadcasted key with the key associated with the identifier of the virtual machine in the service processor table, a secure connection, such as via a virtual universal asynchronous receiver-transmitter (UART) connection, is established between the service processor and the virtual machine. In this manner, the user is able to obtain secure access to a virtual machine via the service processor without the requirement of an intermediary application (e.g., hardware management console) thereby eliminating the previously required operational layer of virtual machine information while ensuring that the connection between the service processor and the virtual machine is the appropriate connection for the appropriate user. These and other features will be discussed in further detail below.

In some embodiments of the present disclosure, the present disclosure comprises a computer-implemented method, system and computer program product for securing access to a virtual machine. In one embodiment of the present disclosure, a broadcasted request from a computing device of a user to establish a virtual session with the virtual machine through a service processor is received. Such a broadcasted request includes an identifier (e.g., universally unique identifier (UUID)) of the virtual machine as well as a key. A UUID, as used herein, is a 128 bit number, composed of 16 octets and represented as 32 base-16 characters. A key, as used herein, refers to a unique identifier that points to its associated value (e.g., identifier of a virtual machine). The key may be fixed length, such as an integer, or variable length, such as a name. A secure connection between the service processor and the computing device of the user is established, such as via the secure shell protocol, in response to the broadcasted identifier of the virtual machine matching the identifier of the virtual machine in a table of the service processor ("service processor table"). In one embodiment, the service processor table stores the identifiers of the virtual machines for which the service processor is responsible for establishing a secure connection to such virtual machines. After establishing the secure connection between the service processor and the computing device of the user, a secure connection between the service processor and the virtual machine is established, such as via a virtual universal asynchronous receiver-transmitter (UART) connection, in response to the broadcasted key matching the key associated with the identifier of the virtual machine in the service processor table. In this manner, the previously required operational layer of virtual machine information is eliminated while adding a new layer of authentication to ensure that the connection between the service processor and the virtual machine is the appropriate connection for the appropriate user. As a result, a secure access to a virtual machine via a service processor is achieved.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a computing device 101 connected to a baseboard 102 via a network 103.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and baseboard 102. It is noted that both computing device 101 and the user of computing device 101 may be identified with element number 101.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

A "baseboard 102," as used herein, refers to a computer, server, network or storage device utilized for monitoring and managing resources. In one embodiment, baseboard 102 includes a service processor 104 configured to facilitate connectivity, such as establishing a connection with a virtual machine 105 using a hypervisor 106.

Service processor 104, as used herein, refers to a small, specialized processor used for remote monitoring and management of a host system. In one embodiment, service processor 104 is located on the main motherboard of baseboard 102 and can be accessed remotely either via a dedicated or shared network connection. An example of such a service processor 104 is a baseboard management controller, part of the intelligent platform management interface.

Virtual machine 105, as used herein, refers to a compute resource that uses software instead of a physical computer to run programs and deploy applications. In one embodiment, one or more virtual "guest" machines, such as virtual machine 105, run on a physical "host" machine. Each virtual machine 105 runs its own operating system and functions separately from the other virtual machines, even when they are all running on the same host.

Hypervisor 106, as used herein, refers to a program used to run and manage virtual machines, such as virtual machine 105. In one embodiment, hypervisor 106 is one of the software components of baseboard 102 which may be loaded into memory (discussed further below in connection with FIG. 6) for execution by a processor (discussed further below in connection with FIG. 6).

As discussed above, currently, when a service processor establishes a connection to the virtual machine for the user, an intermediary application (e.g., hardware management console) is required to be utilized which stores information about all the resources it manages, including the virtual machine information. By storing such virtual machine information, an operational layer is added that provides extraneous information not needed by a user of the virtual machine. Furthermore, there is no security mechanism that is passed directly from the user to the virtual machine to authenticate a connection between the service processor and the virtual machine. That is, there is not currently a means for ensuring that the connection between the service processor and the virtual machine is the appropriate connection for the appropriate user.

The principles of the present disclosure eliminate the requirement of utilizing the intermediary application for establishing the connection to the virtual machine for the user as well as ensure that the connection between the service processor and the virtual machine is the appropriate connection for the appropriate user as discussed below. In one embodiment, service processor 104 of baseboard 102 receives a broadcasted requested from computing device 101 of a user to establish a virtual session with a virtual machine (e.g., virtual machine 105) through service processor 104. In one embodiment, the broadcasted request includes an identifier (e.g., universally unique identifier) of the virtual machine (e.g., virtual machine 105) and a key. A key, as used herein, refers to a unique identifier that points to its associated value (e.g., identifier of a virtual machine) stored in a table of service processor 104 ("service processor table"). In one embodiment, such a table is a data structure, which is stored in a storage device of baseboard 102.

In one embodiment, upon matching the broadcasted identifier of the virtual machine (e.g., virtual machine 105) with an identifier of the virtual machine in the service processor table, service processor 104 of baseboard 102 establishes a secure connection (e.g., secure shell (SSH) connection) between service processor 104 and computing device 101 of the user.

In one embodiment, after establishing a secure connection with computing device 101 and upon matching the broadcasted key with the key associated with the identifier of the virtual machine in the service processor table, service processor 104 of baseboard 102 establishes a secure connection, such as via a virtual universal asynchronous receiver-transmitter (UART) connection, between service processor 104 and the virtual machine (e.g., virtual machine 105) using hypervisor 106.

In this manner, the user (e.g., user of computing device 101) is able to obtain secure access to a virtual machine, such as virtual machine 105, through service processor 104 without the requirement of an intermediary application (e.g., hardware management console) eliminating the previously required operational layer of virtual machine information while ensuring that the connection between the service processor (e.g., service processor 104) and the virtual machine (e.g., virtual machine 105) is the appropriate connection for the appropriate user. These and other features will be discussed in further detail below.

A description of the software components of baseboard 102 used for securing access to a virtual machine (e.g., virtual machine 105) for a user (e.g., user of computing device 101) via a service processor (e.g., service processor 104) using a key is provided below in connection with FIG. 2. A description of the hardware configuration of baseboard 102 is provided further below in connection with FIG. 6.

System 100 is not to be limited in scope to any one particular network architecture. System 100 may include any number of computing devices 101, baseboards 102, networks 103, service processors 104, virtual machines 105 and hypervisors 106.

A discussion regarding the software components used by baseboard 102 to establish a secure access to a virtual machine (e.g., virtual machine 105) through a service processor (e.g., service processor 104) using a key is provided below in connection with FIG. 2.

Figure 2:
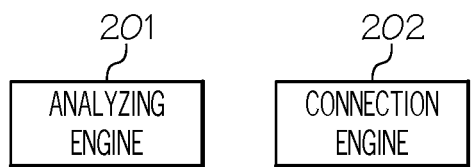
FIG. 2 is a diagram of the software components used by the baseboard to establish a secure access to a virtual machine through a service processor using a key in accordance with an embodiment of the present disclosure.

FIG. 2 is a diagram of the software components used by baseboard 102 to establish a secure access to a virtual machine (e.g., virtual machine 105) through a service processor (e.g., service processor 104) using a key in accordance with an embodiment of the present disclosure.

Referring to FIG. 2, in conjunction with FIG. 1, baseboard 102 includes an analyzing engine 201 configured to determine if the received broadcasted request from computing device 101 of the user includes a matching identifier and key in the service processor table as discussed below.

In one embodiment, analyzing engine 201 receives a broadcasted request from computing device 101 of a user to establish a virtual session with a virtual machine, such as virtual machine 105, through service processor 104. In one embodiment, such a broadcasted request includes an identifier of the virtual machine (e.g., virtual machine 105) to be connected with computing device 101 of the user via service processor 104. In one embodiment, such an identifier corresponds to a universally unique identifier (UUID). A UUID, as used herein, is a 128 bit number, composed of 16 octets and represented as 32 base-16 characters. In one embodiment, such a UUID is generated by the virtual machine in question (e.g., virtual machine 105) based on a timestamp and other factors, such as a network address, using an algorithm or tool, such as the Python® UUID module. In one embodiment, the UUID is generated by the virtual machine in question (e.g., virtual machine 105) by hashing both a namespace identifier and a name using a hashing algorithm, such as the message-digest algorithm 5 (MD5) or the secure hash algorithm 1 (SHA-1). In one embodiment, the virtual machine in question (e.g., virtual machine 105) previously provides computing device 101 such a UUID to be later used by computing device 101 when the user of computing device 101 requests to establish a virtual session with such a virtual machine (e.g., virtual machine 105).

In one embodiment, such an identifier (e.g., UUID) generated by the virtual machine (e.g., virtual machine 105) may also be provided to baseboard 102, which is stored in a table (service processor table, which is discussed below) residing in the storage device of baseboard 102.

Furthermore, in one embodiment, such a broadcasted request includes a key. A key, as used herein, refers to a unique identifier that points to its associated value (e.g., identifier of a virtual machine). The key may be fixed length, such as an integer, or variable length, such as a name. In one embodiment, such a key is generated by the virtual machine in question (e.g., virtual machine 105) using a key generator (e.g., RandomKeygen, Delinea®, Avast®, randID, GenerateRandom, etc.). In one embodiment, the virtual machine in question (e.g., virtual machine 105) previously provides computing device 101 such a key to be later used by computing device 101 when the user of computing device 101 requests to establish a virtual session with such a virtual machine (e.g., virtual machine 105).

In one embodiment, such a key generated by the virtual machine (e.g., virtual machine 105) may also be provided to baseboard 102, which is stored in a table (service processor table, which is discussed below) residing in the storage device of baseboard 102.

In one embodiment, in which there are multiple service processors 104 of multiple baseboards 102, computing device 101 broadcasts the request to establish a virtual session with a virtual machine (e.g., virtual machine 105) to all the service processors 104 of baseboards 102. In one embodiment, such requests are broadcasted via transmission control protocol (TCP)/Internet protocol (IP). As discussed above, such a request includes an identifier, such as the UUID, of the virtual machine (e.g., virtual machine 105) for which computing device 101 desires to establish a virtual session. The identifier is broadcasted to all service processors 104 of baseboards 102 to identify the host containing that identifier, such as in the service processor table discussed above, as shown in FIG. 3.

Figure 3:
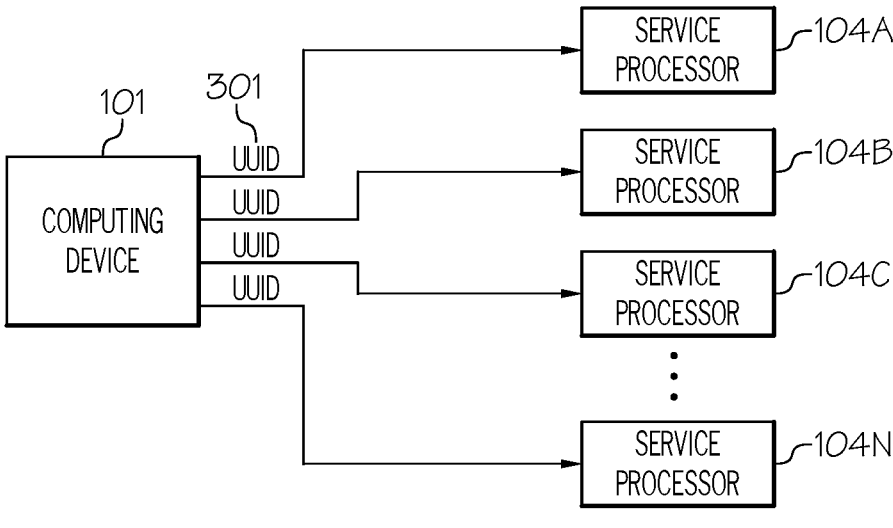
FIG. 3 illustrates the user of a computing device broadcasting a request to establish a virtual session with a virtual machine to all the service processors to find the host containing the identifier of the virtual machine in accordance with an embodiment of the present disclosure.

FIG. 3 illustrates the user of a computing device broadcasting a request to establish a virtual session with a virtual machine to all the service processors (e.g., service processor 104) to find the host containing the identifier of the virtual machine in accordance with an embodiment of the present disclosure.

As shown in FIG. 3, computing device 101 broadcasts the request to establish a virtual session with a virtual machine (e.g., virtual machine 105) to all service processors 104A-104N of baseboards 102 to find the host (e.g., service processor 104A) containing the identifier of the virtual machine (e.g., virtual machine 105). Service processors 104A-104N may collectively or individually be referred to as service processors 104 or service processor 104, respectively.

In one embodiment, such a broadcasted request includes an identifier of the virtual machine (e.g., virtual machine 105), such as the UUID 301 of the virtual machine as shown in FIG. 3.

Figure 4:
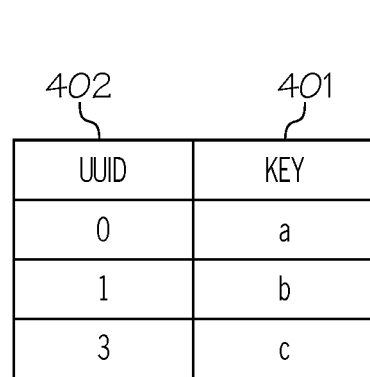
FIG. 4 illustrates an embodiment of the present disclosure of a service processor table.

In one embodiment, for each service processor 104 that received the broadcasted request, analyzing engine 201 of the baseboard 102 containing such a service processor 104 (e.g., service processor 104A) determines if the broadcasted identifier (e.g., UUID 301) matches the identifier (e.g., UUID) in the service processor table for baseboard 102 as illustrated in FIG. 4.

FIG. 4 illustrates an embodiment of the present disclosure of a service processor table 400.

As shown in FIG. 4, service processor table 400 includes key-value pairs, such as pairs of keys 401 and associated identifiers 402 (e.g., UUIDs). For example, as illustrated in FIG. 4, key 401 with the value of "a" is associated with identifier 402 with the value of "0." In another example, key 401 with the value of "b" is associated with identifier 402 with the value of "1." In a further example, key 401 with the value of "c" is associated with identifier 402 with the value of "3."

As previously discussed, such identifiers 402 (e.g., UUIDs) correspond to the identifiers of virtual machines (e.g., virtual machine 105) for which service processor 104 is responsible for establishing a secure connection to such virtual machines. In one embodiment, each virtual machine (e.g., virtual machine 105) is assigned a particular service processor 104 to monitor and manage said virtual machine, including establishing a secure connection to such a virtual machine (e.g., virtual machine 105).

In one embodiment, service processor table 400 is continuously updated to include the list of all identifiers 402 (e.g., UUIDs) and associated keys 401 for those virtual machines for which the associated service processor 104 is responsible for establishing a secure connection to such virtual machines (e.g., virtual machine 105).

In one embodiment, each baseboard 102 maintains its unique service processor table 400 containing the list of all identifiers 402 (e.g., UUIDs) and associated keys 401 for those virtual machines for which the associated service processor 104 is responsible for establishing a secure connection to such virtual machines (e.g., virtual machine 105). In one embodiment, service processor table 400 resides in the storage device of baseboard 102.

Returning to FIG. 2, in conjunction with FIGS. 3-4, as discussed above, analyzing engine 201 determines if the broadcasted identifier (e.g., UUID) matches the identifier (e.g., UUID) in service processor table 400. In one embodiment, analyzing engine 201 utilizes various software tools for determining if the received broadcasted identifier matches an identifier 402 in service processor table 400, including, but not limited to, Senzing®, Datactics®, exorbyte, etc.

If there is not a match, then connection engine 202 of baseboard 102 does not establish a secure connection with computing device 101 of the user.

If, however, there is a match, then connection engine 202 of baseboard 102 establishes a secure connection with computing device 101 of the user. In one embodiment, a secure connection is established via a secure shell (SSH) protocol. A SSH protocol, as used herein, refers to a cryptographic network protocol for operating services securely over an unsecured network. In one embodiment, connection engine 202 utilizes various software tools for establishing a secure connection with computing device 101 of the user, such as via the SSH protocol, including, but not limited to, MobaXterm®, PuTTY, SecureCRT®, KiTTY, etc.

Upon establishing a secure connection with computing device 101 of the user by connection engine 202, analyzing engine 201 determines if the broadcasted key of the request matches key 401 in service processor table 400 that is associated with identifier 402 in service processor table 400 that matched the identifier (e.g., UUID 301) in the broadcasted request.

For example, as shown in FIG. 4, if the broadcasted identifier corresponded to the UUID of 3, then analyzing engine 201 determines if the broadcasted key of the request matches key 401 of service processor table 400 that corresponds to the value of "c." In one embodiment, analyzing engine 201 utilizes various software tools for determining if the broadcasted key matches key 401 in service processor table 400 that is associated with identifier 402 in service processor table 400 that matched the identifier (e.g., UUID 301) in the broadcasted request, including, but not limited to, Senzing®, Datactics®, exorbyte, etc.

If there is not a match, then connection engine 202 of baseboard 102 does not establish a secure connection between service processor 104 and the virtual machine (e.g., virtual machine 105) using hypervisor 106.

If, however, there is a match, then connection engine 202 of baseboard 102 establishes a secure connection between service processor 104 and the virtual machine (e.g., virtual machine 105) using hypervisor 106. In one embodiment, such a secure connection is established via a virtual universal asynchronous receiver-transmitter (UART) connection. A UART connection, as used herein, refers to a hardware communication protocol that uses asynchronous serial communication with configurable speed. In one embodiment, connection engine 202 utilizes various software tools for establishing a secure connection (e.g., UART connection) between service processor 104 and the virtual machine (e.g., virtual machine 105) using hypervisor 106, including, but not limited to, QE®, WisToolBox, Renesas®, etc.

Figure 5:
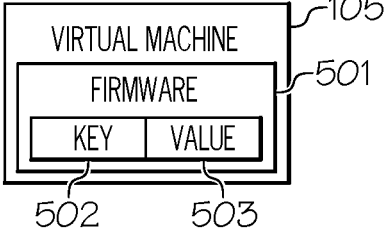
FIG. 5 illustrates the table stored in the firmware of the virtual machine containing the key and the associated value (identifier of the virtual machine) in accordance with an embodiment of the present disclosure.

In the situations in which the broadcasted request to establish a virtual session with a virtual machine (e.g., virtual machine 105) is prior to the booting of the virtual machine or just after booting of the virtual machine, where the virtual machine is in a pre-OS (pre-operating system) state, analyzing engine 201 determines if the broadcasted key and identifier correspond to the key-value pair stored in the firmware of the virtual machine (e.g., virtual machine 105) as illustrated in FIG. 5. A pre-OS state, as used herein, refers to the state of the virtual machine in which the operating system has not yet taken control. Analyzing engine 201 performs such a procedure since the key-value pair (401, 402) in its service processor table 400 may not contain the latest version for the key-value pair (401, 402) for this virtual machine.

Referring to FIG. 5, FIG. 5 illustrates the table stored in the firmware of the virtual machine containing the key and the associated value (identifier of the virtual machine) in accordance with an embodiment of the present disclosure.

As illustrated in FIG. 5, virtual machine 105 includes firmware 501, which stores a key 502 and its associated value (identifier) 503. Firmware 501, as used herein, refers to programming that is written to a hardware device's non-volatile memory.

A key, such as key 502, as used herein, refers to a unique identifier that points to its associated value 503 (e.g., identifier of a virtual machine). The key, such as key 502, may be fixed length, such as an integer, or variable length, such as a name. In one embodiment, such a key is generated by virtual machine 105 using a key generator (e.g., RandomKeygen, Delinea®, Avast®, randID, GenerateRandom, etc.). In one embodiment, virtual machine 105 stores key 502 in firmware 501.

Furthermore, identifier 503 corresponds to an identifier of virtual machine 105, such as a UUID. A UUID, as used herein, is a 128 bit number, composed of 16 octets and represented as 32 base-16 characters. In one embodiment, such a UUID is generated by virtual machine 105 based on a timestamp and other factors, such as a network address, using an algorithm or tool, such as the Python® UUID module. In one embodiment, the UUID is generated by virtual machine 105 by hashing both a namespace identifier and a name using a hashing algorithm, such as the message-digest algorithm 5 (MD5) or the secure hash algorithm 1 (SHA-1). In one embodiment, virtual machine 105 stores identifier 503 in firmware 501.

As previously discussed, in the situations in which the broadcasted request to establish a virtual session with a virtual machine (e.g., virtual machine 105) is prior to the booting of the virtual machine or just after booting of the virtual machine, where the virtual machine is in a pre-OS (pre-operating system) state, analyzing engine 201 determines if the broadcasted key and identifier correspond to the key-value pair (key 502, value 503) stored in firmware 501 of virtual machine 105. In one embodiment, analyzing engine 201 utilizes various software tools for determining if the broadcasted key and identifier correspond to the key-value pair (key 502, value 503) stored in firmware 501 of virtual machine 105, including, but not limited to, Senzing®, Datactics®, exorbyte, etc.

If there is not a match between the broadcasted key and identifier with the key-value pair (key 502, value 503) stored in firmware 501 of virtual machine 105, then connection engine 202 of baseboard 102 does not establish a secure connection between service processor 104 and the virtual machine (e.g., virtual machine 105) using hypervisor 106.

If, however, there is a match between the broadcasted key and identifier with the key-value pair (key 502, value 503) stored in firmware 501 of virtual machine 105, then connection engine 202 of baseboard 102 establishes a secure connection between service processor 104 and the virtual machine (e.g., virtual machine 105) using hypervisor 106. In one embodiment, such a secure connection is established via a virtual universal asynchronous receiver-transmitter (UART) connection. A UART connection, as used herein, refers to a hardware communication protocol that uses asynchronous serial communication with configurable speed. In one embodiment, connection engine 202 utilizes various software tools for establishing a secure connection (e.g., UART connection) between service processor 104 and the virtual machine (e.g., virtual machine 105) using hypervisor 106, including, but not limited to, QE®, WisToolBox, Renesas®, etc.

A further description of these and other features is provided below in connection with the discussion of the method for securing access to a virtual machine via a service processor using a key.

Prior to the discussion of the method for securing access to a virtual machine via a service processor using a key, a description of the hardware configuration of baseboard 102 (FIG. 1) is provided below in connection with FIG. 6.

Figure 6:
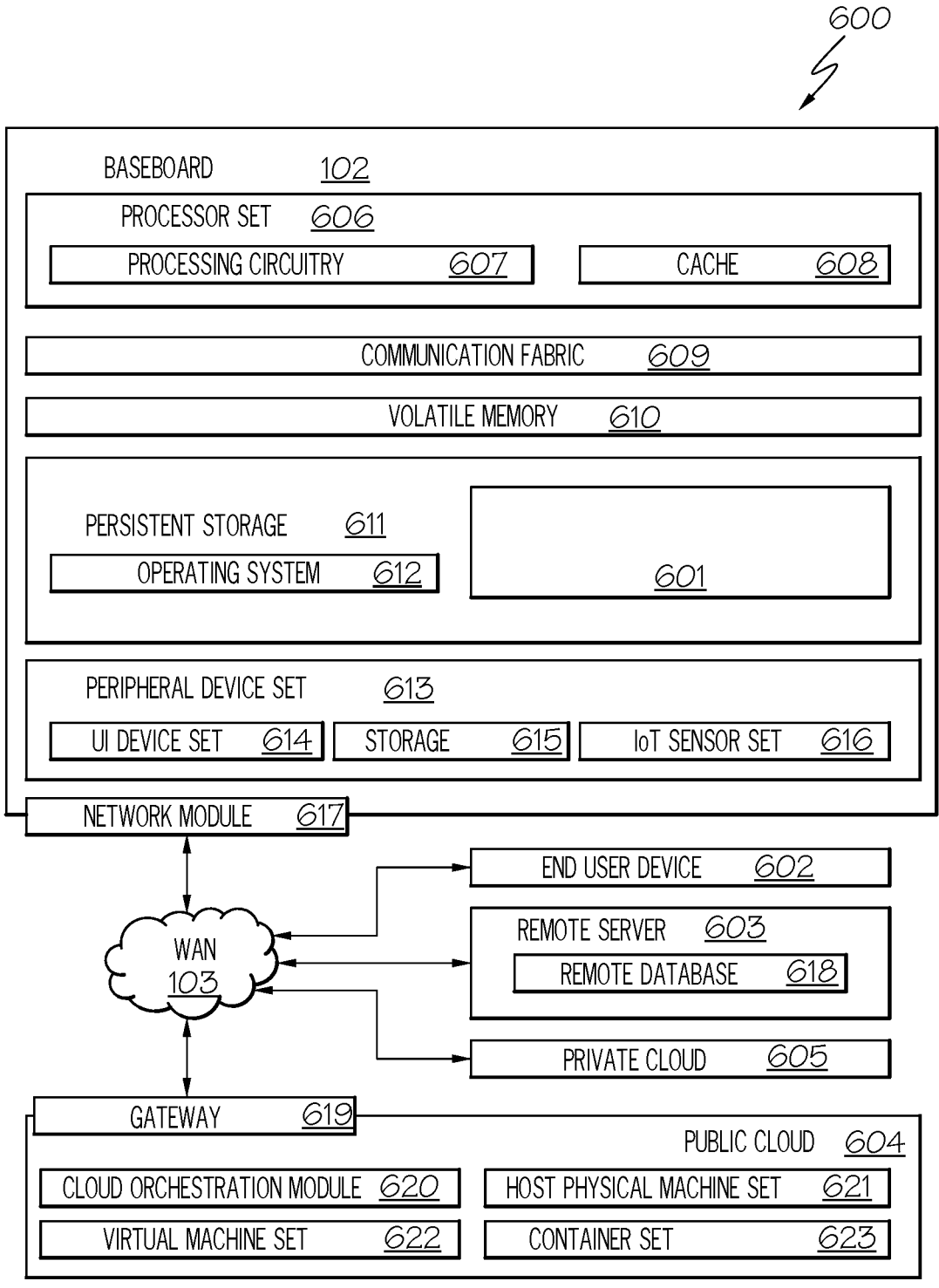
FIG. 6 illustrates an embodiment of the present disclosure of the hardware configuration of the baseboard which is representative of a hardware environment for practicing the present disclosure.

Referring now to FIG. 6, in conjunction with FIG. 1, FIG. 6 illustrates an embodiment of the present disclosure of the hardware configuration of baseboard 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code 601 involved in performing the inventive methods, such as securing access to a virtual machine via a service processor using a key. In addition to block 601, computing environment 600 includes, for example, baseboard 102, network 103, such as a wide area network (WAN), end user device (EUD) 602, remote server 603, public cloud 604, and private cloud 605. In this embodiment, baseboard 102 includes processor set 606 (including processing circuitry 607 and cache 608), communication fabric 609, volatile memory 610, persistent storage 611 (including operating system 612 and block 601, as identified above), peripheral device set 613 (including user interface (UI) device set 614, storage 615, and Internet of Things (IoT) sensor set 616), and network module 617. Remote server 603 includes remote database 618. Public cloud 604 includes gateway 619, cloud orchestration module 620, host physical machine set 621, virtual machine set 622, and container set 623.

Baseboard 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 618. As is well understood in the art of computer technology, and depending upon the technology, performance of a computer-implemented method may be distributed among multiple computers and/ or between multiple locations. On the other hand, in this presentation of computing environment 600, detailed discussion is focused on a single computer, specifically baseboard 102, to keep the presentation as simple as possible. Baseboard 102 may be located in a cloud, even though it is not shown in a cloud in FIG. 6. On the other hand, baseboard 102 is not required to be in a cloud except to any extent as may be affirmatively indicated.

Processor set 606 includes one, or more, computer processors of any type now known or to be developed in the future. Processing circuitry 607 may be distributed over multiple packages, for example, multiple, coordinated integrated circuit chips. Processing circuitry 607 may implement multiple processor threads and/or multiple processor cores. Cache 608 is memory that is located in the processor chip package(s) and is typically used for data or code that should be available for rapid access by the threads or cores running on processor set 606. Cache memories are typically organized into multiple levels depending upon relative proximity to the processing circuitry. Alternatively, some, or all, of the cache for the processor set may be located "off chip." In some computing environments, processor set 606 may be designed for working with qubits and performing quantum computing.

Computer readable program instructions are typically loaded onto baseboard 102 to cause a series of operational steps to be performed by processor set 606 of baseboard 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 608 and the other storage media discussed below. The program instructions, and associated data, are accessed by processor set 606 to control and direct performance of the inventive methods. In computing environment 600, at least some of the instructions for performing the inventive methods may be stored in block 601 in persistent storage 611.

Communication fabric 609 is the signal conduction paths that allow the various components of baseboard 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 610 is any type of volatile memory now known or to be developed in the future. Examples include dynamic type random access memory (RAM) or static type RAM. Typically, the volatile memory is characterized by random access, but this is not required unless affirmatively indicated. In baseboard 102, the volatile memory 610 is located in a single package and is internal to baseboard 102, but, alternatively or additionally, the volatile memory may be distributed over multiple packages and/or located externally with respect to baseboard 102.

Persistent Storage 611 is any form of non-volatile storage for computers that is now known or to be developed in the future. The non-volatility of this storage means that the stored data is maintained regardless of whether power is being supplied to baseboard 102 and/or directly to persistent storage 611. Persistent storage 611 may be a read only memory (ROM), but typically at least a portion of the persistent storage allows writing of data, deletion of data and re-writing of data. Some familiar forms of persistent storage include magnetic disks and solid state storage devices. Operating system 612 may take several forms, such as various known proprietary operating systems or open source Portable Operating System Interface type operating systems that employ a kernel. The code included in block 601 typically includes at least some of the computer code involved in performing the inventive methods.

Peripheral device set 613 includes the set of peripheral devices of baseboard 102. Data communication connections between the peripheral devices and the other components of baseboard 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 614 may include components such as a display screen, speaker, microphone, wearable devices (such as goggles and smart watches), keyboard, mouse, printer, touchpad, game controllers, and haptic devices. Storage 615 is external storage, such as an external hard drive, or insertable storage, such as an SD card. Storage 615 may be persistent and/or volatile. In some embodiments, storage 615 may take the form of a quantum computing storage device for storing data in the form of qubits. In embodiments where baseboard 102 is required to have a large amount of storage (for example, where baseboard 102 locally stores and manages a large database) then this storage may be provided by peripheral storage devices designed for storing very large amounts of data, such as a storage area network (SAN) that is shared by multiple, geographically distributed computers. IoT sensor set 616 is made up of sensors that can be used in Internet of Things applications. For example, one sensor may be a thermometer and another sensor may be a motion detector.

Network module 617 is the collection of computer software, hardware, and firmware that allows baseboard 102 to communicate with other computers through WAN 103. Network module 617 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 617 are performed on the same physical hardware device. In other embodiments (for example, embodiments that utilize software-defined networking (SDN)), the control functions and the forwarding functions of network module 617 are performed on physically separate devices, such that the control functions manage several different network hardware devices. Computer readable program instructions for performing the inventive methods can typically be downloaded to baseboard 102 from an external computer or external storage device through a network adapter card or network interface included in network module 617.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 602 is any computer system that is used and controlled by an end user (for example, a customer of an enterprise that operates baseboard 102), and may take any of the forms discussed above in connection with baseboard 102. EUD 602 typically receives helpful and useful data from the operations of baseboard 102. For example, in a hypothetical case where baseboard 102 is designed to provide a recommendation to an end user, this recommendation would typically be communicated from network module 617 of baseboard 102 through WAN 103 to EUD 602. In this way, EUD 602 can display, or otherwise present, the recommendation to an end user. In some embodiments, EUD 602 may be a client device, such as thin client, heavy client, mainframe computer, desktop computer and so on.

Remote server 603 is any computer system that serves at least some data and/or functionality to baseboard 102. Remote server 603 may be controlled and used by the same entity that operates baseboard 102. Remote server 603 represents the machine(s) that collect and store helpful and useful data for use by other computers, such as baseboard 102. For example, in a hypothetical case where baseboard 102 is designed and programmed to provide a recommendation based on historical data, then this historical data may be provided to baseboard 102 from remote database 618 of remote server 603.

Public cloud 604 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 604 is performed by the computer hardware and/or software of cloud orchestration module 620. The computing resources provided by public cloud 604 are typically implemented by virtual computing environments that run on various computers making up the computers of host physical machine set 621, which is the universe of physical computers in and/or available to public cloud 604. The virtual computing environments (VCEs) typically take the form of virtual machines from virtual machine set 622 and/or containers from container set 623. It is understood that these VCEs may be stored as images and may be transferred among and between the various physical machine hosts, either as images or after instantiation of the VCE. Cloud orchestration module 620 manages the transfer and storage of images, deploys new instantiations of VCEs and manages active instantiations of VCE deployments. Gateway 619 is the collection of computer software, hardware, and firmware that allows public cloud 604 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 605 is similar to public cloud 604, except that the computing resources are only available for use by a single enterprise. While private cloud 605 is depicted as being in communication with WAN 103, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 604 and private cloud 605 are both part of a larger hybrid cloud.

Block 601 further includes the software components discussed above in connection with FIGS. 2-5 to secure access to a virtual machine via a service processor using a key. In one embodiment, such components may be implemented in hardware. The functions discussed above performed by such components are not generic computer functions. As a result, baseboard 102 is a particular machine that is the result of implementing specific, non-generic computer functions.

In one embodiment, the functionality of such software components of baseboard 102, including the functionality for securing access to a virtual machine via a service processor using a key, may be embodied in an application specific integrated circuit.

As stated above, a service processor is used to facilitate connectivity. For example, such a service processor may correspond to a small, specialized processor used for remote monitoring and management of a host system. The specialized processor may include an ARM-based SoC (System on Chip) with graphics and control logic built in. The service processor is commonly located on the main motherboard of the computer, server, network or storage device (the "baseboard") and can be accessed remotely either via a dedicated or shared network connection. Furthermore, the service processor has multiple connections to the host system, giving it an ability to monitor hardware via sensors, flash BIOS (basic input/output system)/UEFI (unified extensible firmware interface) firmware, give console access via serial or physical/virtual KVM (kernel-based virtual machine), power cycle the host, and log events. Currently, in order for the service processor to establish the connection to the virtual machine for the user, an intermediary application, such as a hardware management console, creates a bridge between the user's computing device and the service processor, which then creates a connection to the virtual machine. A hardware management console is a hardware appliance that can be used to configure and control one or more managed systems. Typically, after the user accesses the intermediary application, such as a hardware management console, the intermediary application sends API commends to the service processor to create a virtual terminal (connection between the service processor and the virtual machine) accessible from the intermediary application. In such a connection method, the intermediary application needs to store information about all the resources it manages, including the virtual machine information. By storing such virtual machine information, an operational layer is added that provides extraneous information not needed by a user of the virtual machine. Furthermore, there is no security mechanism that is passed directly from the user to the virtual machine to authenticate a connection between the service processor and the virtual machine. That is, there is not currently a means for ensuring that the connection between the service processor and the virtual machine is the appropriate connection for the appropriate user.

Figure 7:
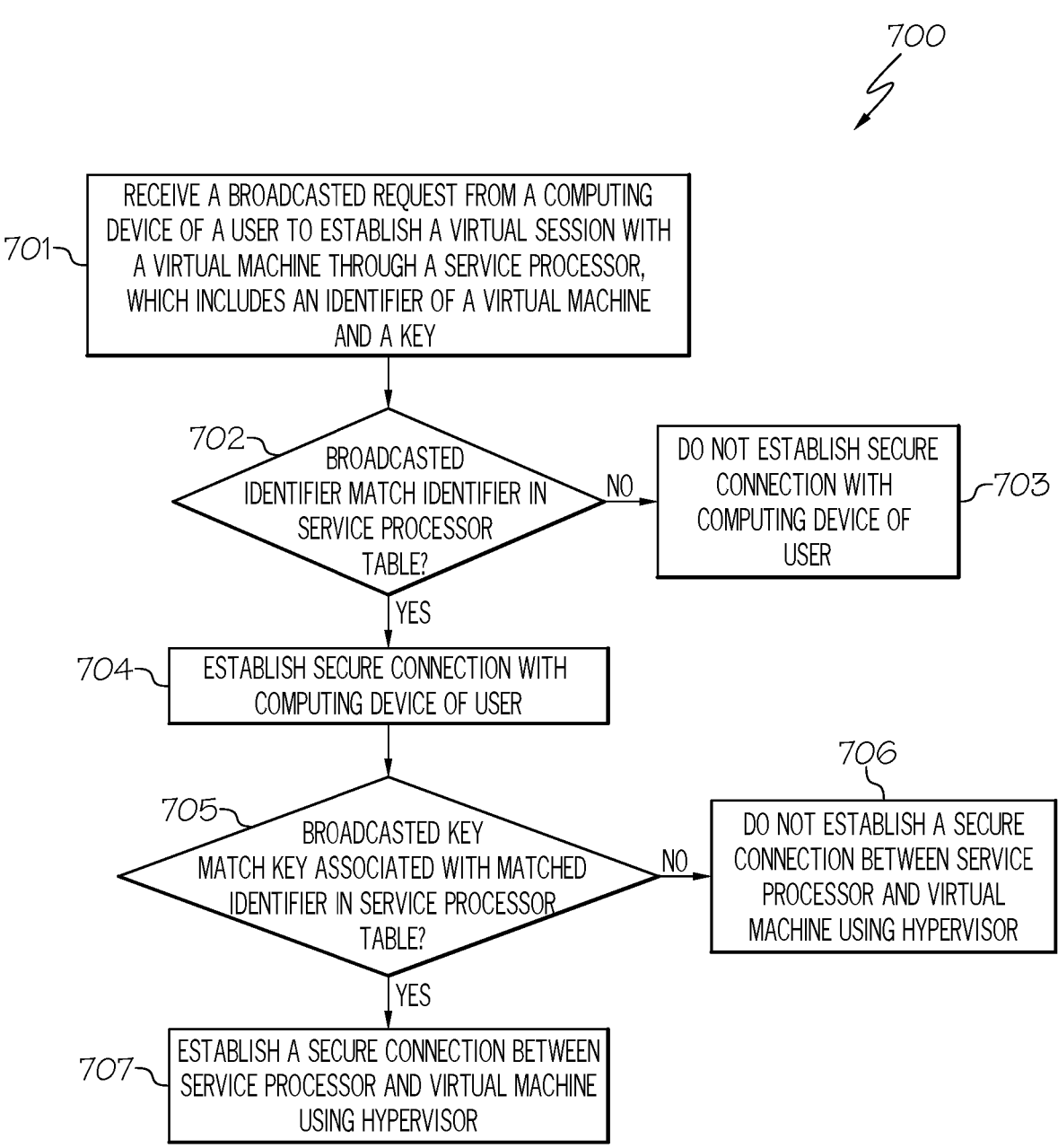
FIG. 7 is a flowchart of a method for securing access to a virtual machine through a service processor using a key in accordance with an embodiment of the present disclosure.
Figure 8:
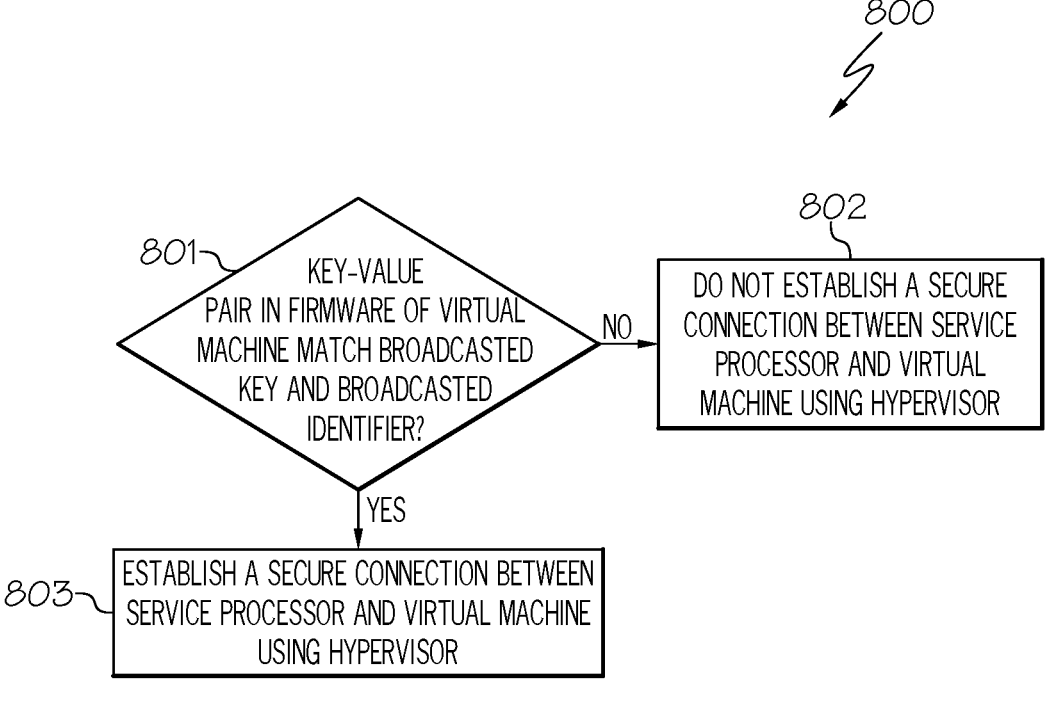
FIG. 8 is a flowchart of a method for securing access to a virtual machine through a service processor when the virtual machine is in a pre-operating system state in accordance with an embodiment of the present disclosure.

The embodiments of the present disclosure provide a means for eliminating the operational layer that provides extraneous information not needed by a user of the virtual machine by eliminating the requirement of using the intermediary application (e.g., hardware management console) for establishing the connection to the virtual machine for the user as discussed below in connection with FIGS. 7-8. Furthermore, embodiments of the present disclosure provide a means for ensuring that the connection between the service processor and the virtual machine is the appropriate connection for the appropriate user as discussed below in connection with FIGS. 7-8. FIG. 7 is a flowchart of a method for securing access to a virtual machine through a service processor using a key. FIG. 8 is a flowchart of a method for securing access to a virtual machine through a service processor when the virtual machine is in a pre-OS state.

As stated above, FIG. 7 is a flowchart of a method 700 for securing access to a virtual machine through a service processor using a key in accordance with an embodiment of the present disclosure.

Referring to FIG. 7, in conjunction with FIGS. 1-6, in operation 701, analyzing engine 201 of baseboard 102 receives a broadcasted request from computing device 101 of a user to establish a virtual session with a virtual machine (e.g., virtual machine 105) through a service processor, such as service processor 104.

As discussed above, in one embodiment, such a broadcasted request includes an identifier of the virtual machine (e.g., virtual machine 105) to be connected with computing device 101 of the user via service processor 104. In one embodiment, such an identifier corresponds to a universally unique identifier (UUID). A UUID, as used herein, is a 128 bit number, composed of 16 octets and represented as 32 base-16 characters. In one embodiment, such a UUID is generated by the virtual machine in question (e.g., virtual machine 105) based on a timestamp and other factors, such as a network address, using an algorithm or tool, such as the Python® UUID module. In one embodiment, the UUID is generated by the virtual machine in question (e.g., virtual machine 105) by hashing both a namespace identifier and a name using a hashing algorithm, such as the message-digest algorithm 5 (MD5) or the secure hash algorithm 1 (SHA-1). In one embodiment, the virtual machine in question (e.g., virtual machine 105) previously provides computing device 101 such a UUID to be later used by computing device 101 when the user of computing device 101 requests to establish a virtual session with such a virtual machine (e.g., virtual machine 105).

In one embodiment, such an identifier (e.g., UUID) generated by the virtual machine (e.g., virtual machine 105) may also be provided to baseboard 102, which is stored in a table (service processor table 400) stored in the storage device (e.g., storage device 611, 615) of baseboard 102.

Furthermore, in one embodiment, such a broadcasted request includes a key. A key, as used herein, refers to a unique identifier that points to its associated value (e.g., identifier of a virtual machine). The key may be fixed length, such as an integer, or variable length, such as a name. In one embodiment, such a key is generated by the virtual machine in question (e.g., virtual machine 105) using a key generator (e.g., RandomKeygen, Delinea®, Avast®, randID, GenerateRandom, etc.). In one embodiment, the virtual machine in question (e.g., virtual machine 105) previously provides computing device 101 such a key to be later used by computing device 101 when the user of computing device 101 requests to establish a virtual session with such a virtual machine (e.g., virtual machine 105).

In one embodiment, such a key generated by the virtual machine (e.g., virtual machine 105) may also be provided to baseboard 102, which is stored in a table (service processor table 400) stored in the storage device (e.g., storage device 611, 615) of baseboard 102.

In one embodiment, in which there are multiple service processors 104 of multiple baseboards 102, computing device 101 broadcasts the request to establish a virtual session with a virtual machine (e.g., virtual machine 105) to all the service processors 104 of baseboards 102. In one embodiment, such requests are broadcasted via transmission control protocol (TCP)/Internet protocol (IP). As discussed above, such a request includes an identifier, such as the UUID (e.g., UUID 301), of the virtual machine (e.g., virtual machine 105) for which computing device 101 desires to establish a virtual session. The identifier is broadcasted to all service processors 104 of baseboards 102 by computing device 101 to identify the host containing that identifier, such as in service processor table 400, as illustrated in FIG. 3.

As shown in FIG. 3, computing device 101 broadcasts the request to establish a virtual session with a virtual machine (e.g., virtual machine 105) to all service processors 104A-104N of baseboards 102 to find the host (e.g., service processor 104A) containing the identifier of the virtual machine (e.g., virtual machine 105).

In one embodiment, such a broadcasted request includes an identifier of the virtual machine (e.g., virtual machine 105), such as the UUID 301 of the virtual machine as shown in FIG. 3.

In operation 702, for each service processor 104 that received the broadcasted request, analyzing engine 201 of baseboard 102 containing such a service processor 104 (e.g., service processor 104A) determines if the broadcasted identifier (e.g., UUID 301) matches the identifier (e.g., UUID 402) in service processor table 400.

As stated above, as shown in FIG. 4, service processor table 400 includes key-value pairs, such as pairs of keys 401 and associated identifiers 402 (e.g., UUIDs). For example, as illustrated in FIG. 4, key 401 with the value of "a" is associated with identifier 402 with the value of "0." In another example, key 401 with the value of "b" is associated with identifier 402 with the value of "1." In a further example, key 401 with the value of "c" is associated with identifier 402 with the value of "3."

As previously discussed, such identifiers 402 (e.g., UUIDs) correspond to the identifiers of virtual machines (e.g., virtual machine 105) for which service processor 104 is responsible for establishing a secure connection to such virtual machines. In one embodiment, each virtual machine (e.g., virtual machine 105) is assigned a particular service processor 104 to monitor and manage said virtual machine, including establishing a secure connection to such a virtual machine (e.g., virtual machine 105).

In one embodiment, service processor table 400 is continuously updated to include the list of all identifiers 402 (e.g., UUIDs) and associated keys 401 for those virtual machines for which the associated service processor 104 is responsible for establishing a secure connection to such virtual machines (e.g., virtual machine 105).

In one embodiment, each baseboard 102 maintains its unique service processor table 400 containing the list of all identifiers 402 (e.g., UUIDs) and associated keys 401 for those virtual machines for which the associated service processor 104 is responsible for establishing a secure connection to such virtual machines (e.g., virtual machine 105). In one embodiment, service processor table 400 resides in the storage device (e.g., storage device 611, 615) of baseboard 102.

In one embodiment, analyzing engine 201 utilizes various software tools for determining if the received broadcasted identifier matches an identifier 402 in service processor table 400, including, but not limited to, Senzing®, Datactics®, exorbyte, etc.

If there is not a match, then, in operation 703, connection engine 202 of baseboard 102 does not establish a secure connection with computing device 101 of the user.

If, however, there is a match, then, in operation 704, connection engine 202 of baseboard 102 establishes a secure connection with computing device 101 of the user.

As discussed above, in one embodiment, such a secure connection is established via a secure shell (SSH) protocol. A SSH protocol, as used herein, refers to a cryptographic network protocol for operating services securely over an unsecured network. In one embodiment, connection engine 202 utilizes various software tools for establishing a secure connection with computing device 101 of the user, such as via the SSH protocol, including, but not limited to, MobaXterm®, PuTTY, SecureCRT®, KiTTY, etc.

Upon establishing a secure connection with computing device 101 of the user by connection engine 202, in operation 705, analyzing engine 201 of baseboard 102 determines if the broadcasted key of the request matches key 401 in service processor table 400 that is associated with identifier 402 in service processor table 400 that matched the identifier (e.g., UUID 301) in the broadcasted request.

For example, as shown in FIG. 4, if the broadcasted identifier corresponded to the UUID of 3, then analyzing engine 201 determines if the broadcasted key of the request matches key 401 of service processor table 400 that corresponds to the value of "c." In one embodiment, analyzing engine 201 utilizes various software tools for determining if the broadcasted key matches key 401 in service processor table 400 that is associated with identifier 402 in service processor table 400 that matched the identifier (e.g., UUID 301) in the broadcasted request, including, but not limited to, Senzing®, Datactics®, exorbyte, etc.

If there is not a match, then, in, operation 706, connection engine 202 of baseboard 102 does not establish a secure connection between service processor 104 and the virtual machine (e.g., virtual machine 105) using hypervisor 106.

If, however, there is a match, then, in operation 707, connection engine 202 of baseboard 102 establishes a secure connection between service processor 104 and the virtual machine (e.g., virtual machine 105) using hypervisor 106.

As stated above, in one embodiment, such a secure connection is established via a virtual universal asynchronous receiver-transmitter (UART) connection. A UART connection, as used herein, refers to a hardware communication protocol that uses asynchronous serial communication with configurable speed. In one embodiment, connection engine 202 utilizes various software tools for establishing a secure connection (e.g., UART connection) between service processor 104 and the virtual machine (e.g., virtual machine 105) using hypervisor 106, including, but not limited to, QE®, WisToolBox, Renesas®, etc.

The principles of the present disclosure further handle the situation in which the broadcasted request to establish a virtual session with a virtual machine (e.g., virtual machine 105) through service processor 104 is prior to the booting of the virtual machine or just after booting of the virtual machine, where the virtual machine is in a pre-OS (pre-operating system) state, as discussed below in connection with FIG. 8.

FIG. 8 is a flowchart of a method 800 for securing access to a virtual machine through a service processor when the virtual machine is in a pre-OS state in accordance with an embodiment of the present disclosure. A pre-OS state, as used herein, refers to the state of the virtual machine in which the operating system has not yet taken control.

Referring to FIG. 8, in conjunction with FIGS. 1-7, in operation 801, analyzing engine 201 of baseboard 102 determines if the broadcasted key and identifier correspond to the key-value pair (key 502, value 503) stored in firmware 501 of the virtual machine (e.g., virtual machine 105) as illustrated in FIG. 5.

As discussed above, analyzing engine 201 performs such a procedure since the key-value pair (401, 402) in its service processor table 400 may not contain the latest version for the key-value pair (401, 402) for this virtual machine.

As illustrated in FIG. 5, virtual machine 105 includes firmware 501, which stores a key 502 and its associated value (identifier) 503. Firmware 501, as used herein, refers to programming that is written to a hardware device's non-volatile memory.

A key, such as key 502, as used herein, refers to a unique identifier that points to its associated value 503 (e.g., identifier of a virtual machine). The key, such as key 502, may be fixed length, such as an integer, or variable length, such as a name. In one embodiment, such a key is generated by virtual machine 105 using a key generator (e.g., RandomKeygen, Delinea®, Avast®, randID, GenerateRandom, etc.). In one embodiment, virtual machine 105 stores key 502 in firmware 501.

Furthermore, identifier 503 corresponds to an identifier of virtual machine 105, such as a UUID. A UUID, as used herein, is a 128 bit number, composed of 16 octets and represented as 32 base-16 characters. In one embodiment, such a UUID is generated by virtual machine 105 based on a timestamp and other factors, such as a network address, using an algorithm or tool, such as the Python® UUID module. In one embodiment, the UUID is generated by virtual machine 105 by hashing both a namespace identifier and a name using a hashing algorithm, such as the message-digest algorithm 5 (MD5) or the secure hash algorithm 1 (SHA-1). In one embodiment, virtual machine 105 stores identifier 503 in firmware 501.

As previously discussed, in the situations in which the broadcasted request to establish a virtual session with a virtual machine (e.g., virtual machine 105) through service processor 104 is prior to the booting of the virtual machine or just after booting of the virtual machine, where the virtual machine is in a pre-OS (pre-operating system) state, analyzing engine 201 determines if the broadcasted key and identifier correspond to the key-value pair (key 502, value 503) stored in firmware 501 of virtual machine 105. In one embodiment, analyzing engine 201 utilizes various software tools for determining if the broadcasted key and identifier correspond to the key-value pair (key 502, value 503) stored in firmware 501 of virtual machine 105, including, but not limited to, Senzing®, Datactics®, exorbyte, etc.

If there is not a match between the broadcasted key and identifier with the key-value pair (key 502, value 503) stored in firmware 501 of virtual machine 105, then, in operation 802, connection engine 202 of baseboard 102 does not establish a secure connection between service processor 104 and the virtual machine (e.g., virtual machine 105) using hypervisor 106.

If, however, there is a match between the broadcasted key and identifier with the key-value pair (key 502, value 503) stored in firmware 501 of virtual machine 105, then, in operation 803, connection engine 202 of baseboard 102 establishes a secure connection between service processor 104 and the virtual machine (e.g., virtual machine 105) using hypervisor 106.

As state above, in one embodiment, such a secure connection is established via a virtual universal asynchronous receiver-transmitter (UART) connection. In one embodiment, connection engine 202 utilizes various software tools for establishing a secure connection (e.g., UART connection) between service processor 104 and the virtual machine (e.g., virtual machine 105) using hypervisor 106, including, but not limited to, QE®, WisToolBox, Renesas®, etc.

As a result of the foregoing, the principles of the present disclosure provide a means for eliminating the previously required operational layer of virtual machine information while adding a new layer of authentication to ensure that the connection between the service processor and the virtual machine is the appropriate connection for the appropriate user.

Furthermore, the principles of the present disclosure establish a virtual session with a virtual machine without the requirement of a software layer to create a virtual session. Instead, only a single secure connection (e.g., SSH connection) between the computing device of the user and the service processor needs to be established.

Furthermore, the principles of the present disclosure improve the technology or technical field involving a distributed computing environment. As discussed above, a service processor is used to facilitate connectivity. For example, such a service processor may correspond to a small, specialized processor used for remote monitoring and management of a host system. The specialized processor may include an ARM-based SoC (System on Chip) with graphics and control logic built in. The service processor is commonly located on the main motherboard of the computer, server, network or storage device (the "baseboard") and can be accessed remotely either via a dedicated or shared network connection. Furthermore, the service processor has multiple connections to the host system, giving it an ability to monitor hardware via sensors, flash BIOS (basic input/output system)/UEFI (unified extensible firmware interface) firmware, give console access via serial or physical/virtual KVM (kernel-based virtual machine), power cycle the host, and log events. Currently, in order for the service processor to establish the connection to the virtual machine for the user, an intermediary application, such as a hardware management console, creates a bridge between the user's computing device and the service processor, which then creates a connection to the virtual machine. A hardware management console is a hardware appliance that can be used to configure and control one or more managed systems. Typically, after the user accesses the intermediary application, such as a hardware management console, the intermediary application sends API commends to the service processor to create a virtual terminal (connection between the service processor and the virtual machine) accessible from the intermediary application. In such a connection method, the intermediary application needs to store information about all the resources it manages, including the virtual machine information. By storing such virtual machine information, an operational layer is added that provides extraneous information not needed by a user of the virtual machine. Furthermore, there is no security mechanism that is passed directly from the user to the virtual machine to authenticate a connection between the service processor and the virtual machine. That is, there is not currently a means for ensuring that the connection between the service processor and the virtual machine is the appropriate connection for the appropriate user.

Embodiments of the present disclosure improve such technology by receiving a broadcasted request from a computing device of a user to establish a virtual session with the virtual machine through a service processor. Such a broadcasted request includes an identifier (e.g., universally unique identifier (UUID)) of the virtual machine as well as a key. A UUID, as used herein, is a 128 bit number, composed of 16 octets and represented as 32 base-16 characters. A key, as used herein, refers to a unique identifier that points to its associated value (e.g., identifier of a virtual machine). The key may be fixed length, such as an integer, or variable length, such as a name. A secure connection between the service processor and the computing device of the user is established, such as via the secure shell protocol, in response to the broadcasted identifier of the virtual machine matching the identifier of the virtual machine in a table of the service processor ("service processor table"). In one embodiment, the service processor table stores the identifiers of the virtual machines for which the service processor is responsible for establishing a secure connection to such virtual machines. After establishing the secure connection between the service processor and the computing device of the user, a secure connection between the service processor and the virtual machine is established, such as via a virtual universal asynchronous receiver-transmitter (UART) connection, in response to the broadcasted key matching the key associated with the identifier of the virtual machine in the service processor table. In this manner, the previously required operational layer of virtual machine information is eliminated while adding a new layer of authentication to ensure that the connection between the service processor and the virtual machine is the appropriate connection for the appropriate user. As a result, a secure access to a virtual machine via a service processor is achieved. Furthermore, in this manner, there is an improvement in the technical field involving a distributed computing environment.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a computer-implemented method for securing access to a virtual machine comprises receiving a broadcasted request from a computing device of a user to establish a virtual session with the virtual machine through a service processor, where the broadcasted request comprises an identifier of the virtual machine and a key. The method further comprises establishing a secure connection between the service processor and the computing device of the user in response to matching the broadcasted identifier of the virtual machine with an identifier of the virtual machine in a table. The method additionally comprises establishing a secure connection between the service processor and the virtual machine in response to matching the broadcasted key with a key associated with the identifier of the virtual machine in the table.

Furthermore, in one embodiment of the present disclosure, the method additionally comprises determining if a key-value pair in firmware of the virtual machine matches the broadcasted key and the broadcasted identifier of the virtual machine, respectively, prior to or after booting of the virtual machine where the virtual machine is in a pre-operating system state.

Additionally, in one embodiment of the present disclosure, the method further comprises establishing the secure connection between the service processor and the virtual machine in response to the key-value pair in the firmware of the virtual machine matching the broadcasted key and the broadcasted identifier of the virtual machine, respectively.

Furthermore, in one embodiment of the present disclosure, the method additionally comprises having the secure connection between the service processor and the computing device of the user be established via a secure shell protocol.

Additionally, in one embodiment of the present disclosure, the method further comprises having the secure connection between the service processor and the virtual machine be established via a virtual universal asynchronous receiver-transmitter connection.

Furthermore, in one embodiment of the present disclosure, the method additionally comprises having the broadcasted request be broadcasted via transmission control protocol/Internet protocol.

Additionally, in one embodiment of the present disclosure, the method further comprises having the broadcasted identifier of the virtual machine correspond to a universally unique identifier.

Other forms of the embodiments of the computer-implemented method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for securing access to a virtual machine, the method comprising:
   receiving a broadcasted request from a computing device of a user to establish a virtual session with said virtual machine through a service processor, wherein said broadcasted request comprises an identifier of said virtual machine and a key;
   establishing a secure connection between said service processor and said computing device of said user in response to matching said broadcasted identifier of said virtual machine with an identifier of said virtual machine in a table; and
   establishing a secure connection between said service processor and said virtual machine in response to matching said broadcasted key with a key associated with said identifier of said virtual machine in said table.

2. The method as recited in claim 1 further comprising:
   determining if a key-value pair in firmware of said virtual machine matches said broadcasted key and said broadcasted identifier of said virtual machine, respectively, prior to or after booting of said virtual machine where said virtual machine is in a pre-operating system state.

3. The method as recited in claim 2 further comprising:
   establishing said secure connection between said service processor and said virtual machine in response to said key-value pair in said firmware of said virtual machine matching said broadcasted key and said broadcasted identifier of said virtual machine, respectively.

4. The method as recited in claim 1, wherein said secure connection between said service processor and said computing device of said user is established via a secure shell protocol.

5. The method as recited in claim 1, wherein said secure connection between said service processor and said virtual machine is established via a virtual universal asynchronous receiver-transmitter connection.

6. The method as recited in claim 1, wherein said broadcasted request is broadcasted via transmission control protocol/Internet protocol.

7. The method as recited in claim 1, wherein said broadcasted identifier of said virtual machine corresponds to a universally unique identifier.

8. A computer program product for securing access to a virtual machine, the computer program product comprising one or more computer readable storage mediums having program code embodied therewith, the program code comprising programming instructions for:

receiving a broadcasted request from a computing device of a user to establish a virtual session with said virtual machine through a service processor, wherein said broadcasted request comprises an identifier of said virtual machine and a key;

establishing a secure connection between said service processor and said computing device of said user in response to matching said broadcasted identifier of said virtual machine with an identifier of said virtual machine in a table; and establishing a secure connection between said service processor and said virtual machine in response to matching said broadcasted key with a key associated with said identifier of said virtual machine in said table.

9. The computer program product as recited in claim 8, wherein the program code further comprises the programming instructions for:

determining if a key-value pair in firmware of said virtual machine matches said broadcasted key and said broadcasted identifier of said virtual machine, respectively, prior to or after booting of said virtual machine where said virtual machine is in a pre-operating system state.

10. The computer program product as recited in claim 9, wherein the program code further comprises the programming instructions for:

establishing said secure connection between said service processor and said virtual machine in response to said key-value pair in said firmware of said virtual machine matching said broadcasted key and said broadcasted identifier of said virtual machine, respectively.

11. The computer program product as recited in claim 8, wherein said secure connection between said service processor and said computing device of said user is established via a secure shell protocol.

12. The computer program product as recited in claim 8, wherein said secure connection between said service processor and said virtual machine is established via a virtual universal asynchronous receiver-transmitter connection.

13. The computer program product as recited in claim 8, wherein said broadcasted request is broadcasted via transmission control protocol/Internet protocol.

14. The computer program product as recited in claim 8, wherein said broadcasted identifier of said virtual machine corresponds to a universally unique identifier.

15. A system, comprising:

a memory for storing a computer program for securing access to a virtual machine; and a processor connected to said memory, wherein said processor is configured to execute program instructions of the computer program comprising:

receiving a broadcasted request from a computing device of a user to establish a virtual session with said virtual machine through a service processor, wherein said broadcasted request comprises an identifier of said virtual machine and a key;

establishing a secure connection between said service processor and said computing device of said user in response to matching said broadcasted identifier of said virtual machine with an identifier of said virtual machine in a table; and establishing a secure connection between said service processor and said virtual machine in response to matching said broadcasted key with a key associated with said identifier of said virtual machine in said table.

16. The system as recited in claim 15, wherein the program instructions of the computer program further comprise:

determining if a key-value pair in firmware of said virtual machine matches said broadcasted key and said broadcasted identifier of said virtual machine, respectively, prior to or after booting of said virtual machine where said virtual machine is in a pre-operating system state.

17. The system as recited in claim 16, wherein the program instructions of the computer program further comprise:

establishing said secure connection between said service processor and said virtual machine in response to said key-value pair in said firmware of said virtual machine matching said broadcasted key and said broadcasted identifier of said virtual machine, respectively.

18. The system as recited in claim 15, wherein said secure connection between said service processor and said computing device of said user is established via a secure shell protocol.

19. The system as recited in claim 15, wherein said secure connection between said service processor and said virtual machine is established via a virtual universal asynchronous receiver-transmitter connection.

20. The system as recited in claim 15, wherein said broadcasted request is broadcasted via transmission control protocol/Internet protocol.

* * * * *